Aug. 29, 1933.  W. W. SAYERS  1,924,807
GUIDE ROLL MOUNT
Filed July 28, 1930  3 Sheets-Sheet 1
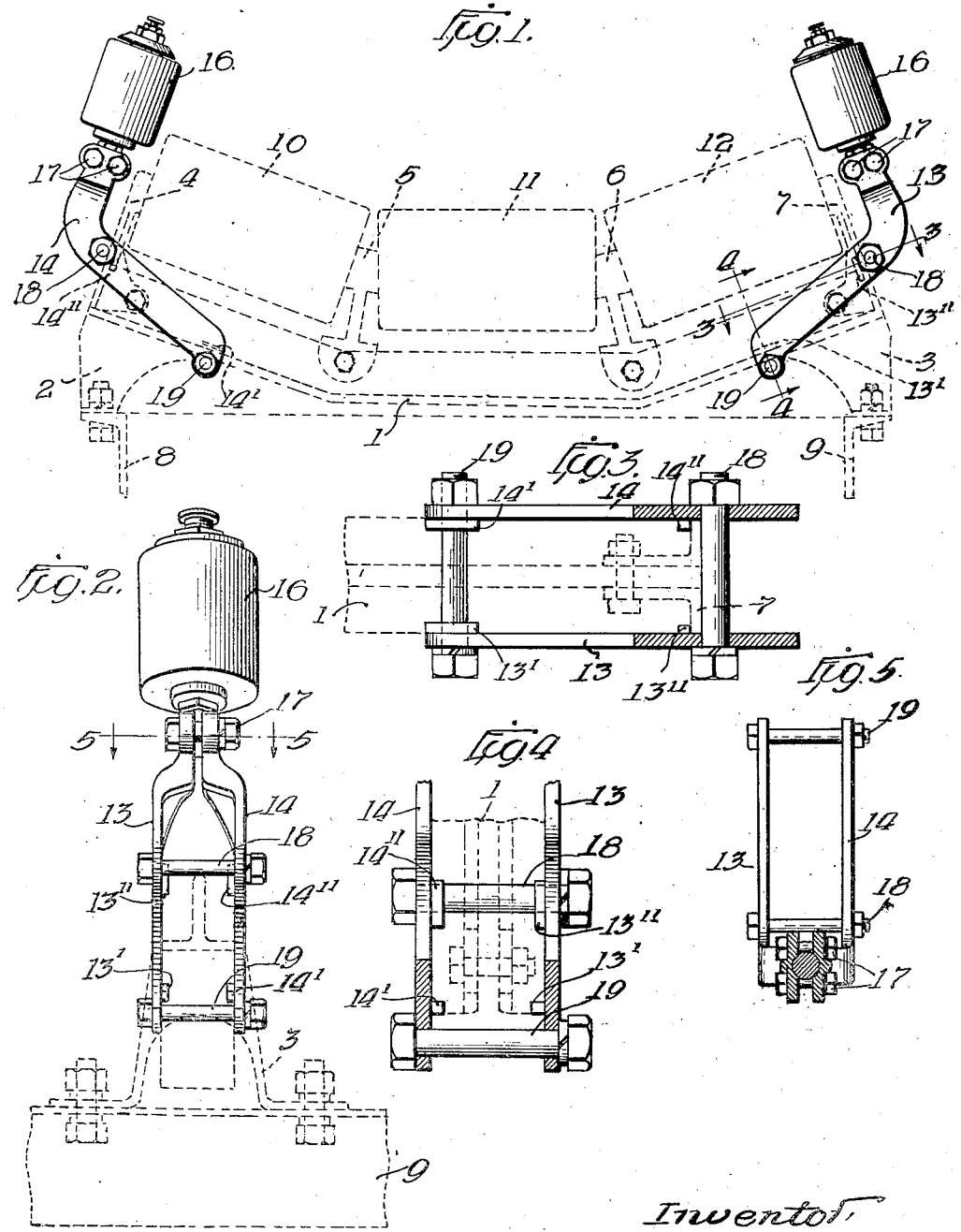

Aug. 29, 1933.   W. W. SAYERS   1,924,807
GUIDE ROLL MOUNT
Filed July 28, 1930   3 Sheets-Sheet 2
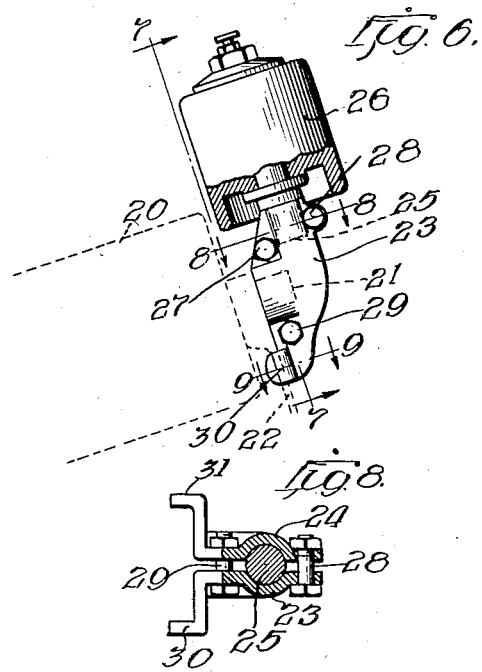
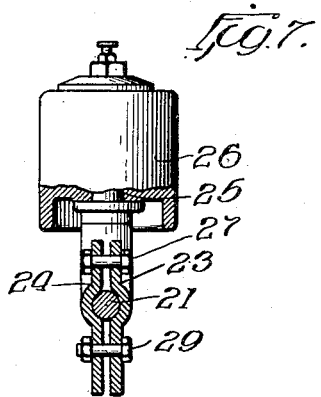
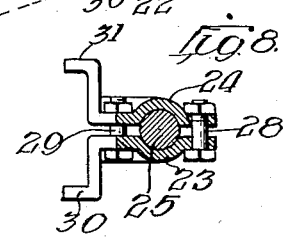
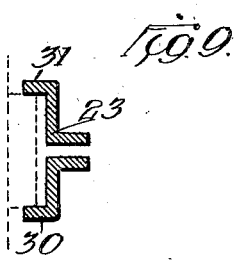
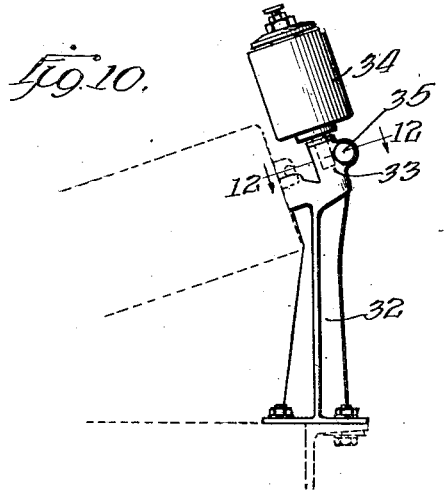
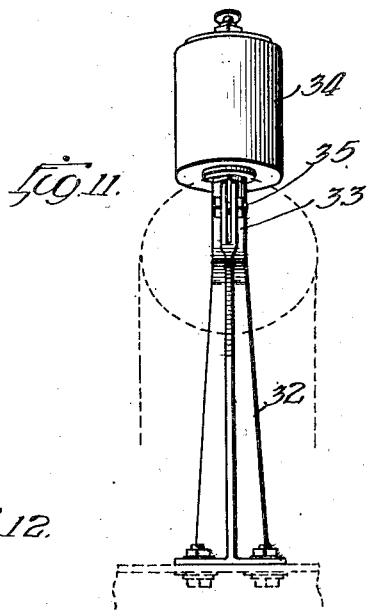
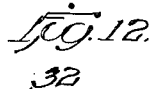
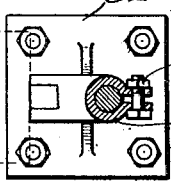

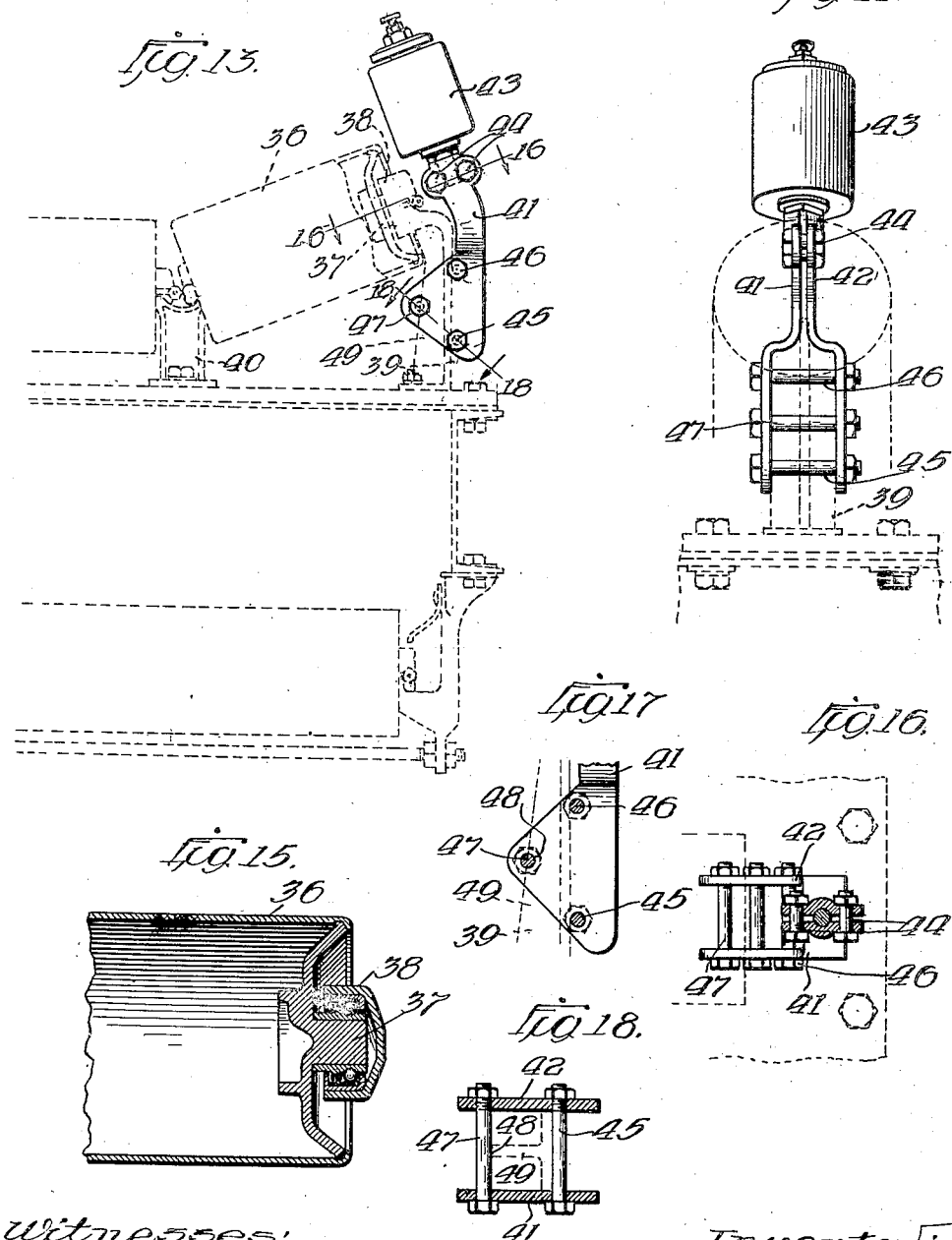

Patented Aug. 29, 1933

1,924,807

UNITED STATES PATENT OFFICE 1,924,807

GUIDE ROLL MOUNT

William W. Sayers, Chicago, Ill., assignor to Link-Belt Company, a corporation of Illinois Application July 28, 1930. Serial No. 471,404

10 Claims. (Cl. 198—202)

This invention relates to belt conveyors and the like, such as usually comprise an endless conveyor belt and one or more belt supporting units. These supporting units are commonly known as idlers and will be referred to as such in the following description and claims. Each idler usually comprises a frame and one or more main or belt supporting rolls journaled thereon. Where a plurality of idlers are employed in a conveyor system, they are spaced suitable distances apart and the main rolls thereof serve to support the loaded conveyor belt. Certain ones of the idlers may also have return rolls to support the returning unloaded portion of the belt. In order to prevent lateral shifting of the conveyor belt it is desirable to provide guide rolls positioned adjacent the edges of the belt. These may be mounted on the idler or idlers, or independently thereof, as may be desired. However, it is preferred to mount them on the idlers, and the present invention is particularly concerned with improved mounting means for this purpose.

The primary object of this invention is to provide a simplified guide roll mount for belt conveyor idlers and the like, and more particularly, one which is readily applicable to existing or standard idlers.

It is also an object of the invention to provide a guide roll mount which may preferably be applied to and detached from an idler without in any way disturbing or altering assembly of the latter.

A further object of the invention is to provide a guide roll mount which will lie substantially within the lateral confines of the idler proper.

Other objects of the invention are concerned with the particular structural features shown in the accompanying drawings.

Referring to the drawings,

Figure 1 is a view in side elevation showing the improved guide roll mount associated with a conventional type of conveyor idler, the latter being shown in dotted outline.

Figure 2 is a view in end elevation showing the guide roll mount, with portions of the idler in dotted outline.

Figures 3 and 4 are sectional views taken along lines 3—3 and 4—4 respectively, of Figure 1.

Figure 5 is a sectional view along line 5—5 of Figure 2.

Figure 6 is a view illustrating a modified form of guide roll mount.

Figures 7, 8 and 9 are sectional views taken along lines 7—7, 8—8 and 9—9, respectively, of Figure 6.

Figure 10 is a view in side elevation illustrating a second modified form of guide roll mount.

Figure 11 is a view in end elevation, of the structure shown in Figure 10.

Figure 12 is a sectional view taken along line 12—12 of Figure 10.

Figure 13 is a view in side elevation illustrating a third modified form of guide roll mount as applied to a different type of idler, the latter being shown in dotted outline.

Figure 14 is a view in end elevation, of the construction shown in Figure 13.

Figure 15 is an enlarged sectional view showing the construction of one of the main rolls and bearing units of Figure 13.

Figure 16 is a sectional view taken along line 16—16 of Figure 13.

Figure 17 is an enlarged detail view of a portion of Figure 13.

Figure 18 is a sectional view taken along line 18—18 of Figure 13.

The frame of the idler shown includes a T section beam 1, having depending legs 2 and 3. The upstanding arms or brackets 4, 5, 6 and 7 are preferably separate elements securely attached to the beam, but may be integral therewith if desired. Legs 2 and 3 rest upon and are secured to longitudinal supporting beams 8 and 9 respectively, while arms 4, 5, 6 and 7 support the ends of one or more shafts on which the main rolls 10, 11 and 12 are rotatably mounted.

The improved guide roll mount according to certain forms of the present invention is designed to be detachably associated with the frame of the idler, and to this end each mount comprises a pair of complemental members, preferably castings, as indicated at 13 and 14 in Figure 2. These members are so formed that one end they cooperate to provide a socket which is adapted to receive and clamp one end of the shaft or spindle of a guide roll. The necessary clamping action is accomplished by means of bolts 17, as will be readily understood. These members 13 and 14 are laterally offset throughout the remainder of their length and, as shown in Figure 2, they cooperate to form a yoke like clamp, bolts 18 and 19 being provided to give the necessary clamping action on the idler frame.

Referring to Figure 1, it will be noted that the members 13 and 14 lie one on either side of the beam 1. Each of members 13 and 14 is provided with two inwardly extending lugs, indicated at 13', 13'' and 14', 14'' respectively. Lugs 13' and 14' are designed to engage the upper flange surface of the beam 1, while lugs 13'' and 14'' are arranged to engage the inner flange surfaces of upstanding arms or brackets 4 and 7. The bolts 19 which pass thru members 13 and 14 are arranged to lie in engagement with the lower surface of beam 1, while bolts 18 are positioned to engage the outer surfaces of brackets 4 and 7. Thus, the mount is accurately positioned and confined on the frame of the conveyor unit and may be rigidly held in this position by merely tightening bolts 18 and 19. It is noted that in the particular construction shown, the axis of guide roll 16 lies in the vertical plane of the axes of main rolls 10, 11 and 12. Although this arrangement is quite advantageous it is not an essential feature and it is to be understood that the mount may be designed to position the axis of guide roll 16 on either side of the vertical plane passing thru the axes of the outside main rolls, without altering the major purposes or advantages thereof.

In Figures 6 to 9 inclusive there is illustrated a modified form of guide roll mount which is designed for support upon extensions of the end main roll shafts of an idler. In Figure 6, an end main roll 20, a shaft extension 21 and an end shaft supporting bracket 22 are shown in dotted outline. The mount comprises a pair of mating clamp members 23 and 24 which are so formed as to provide sockets for reception of the shaft extension 21 and one end of spindle 25 of guide roll 26, respectively. These members 23 and 24 may be drawn together by means of suitably positioned bolts 27, 28 and 29, thus rigidly clamping the ends of shaft 21 and spindle 25 between them. It will be understood, of course, that shaft 21 is a "dead shaft", the roll 20 being rotatably mounted upon it. The modified structure thus far described may be utilized as a complete mount, but is desirable to provide additional means to prevent possible lateral or oscillating movement of the mount about shaft 21, in the event bolts 27, 28 and 29 became slightly loosened. For this purpose, the clamp members 23 and 24 are provided with portions 30 and 31 respectively, designed to extend over and engage the lateral edges of bracket 22, as clearly illustrated in Figures 6, 8 and 9. This modified form of mount provides a very rigid support for the guide roll and yet is quite simple and inexpensive in construction and requires but little time for attachment or detachment.

A second modified form of mount is illustrated in Figures 10, 11 and 12. According to this form, the shaft supporting end bracket 32, preferably a casting, has formed integral therewith a slotted clamp socket 33 which is designed to receive one end of the spindle of guide roll 34. A bolt 35 provides the necessary clamping action to retain the guide roll spindle in the socket.

Figures 13 to 18 inclusive show a third modification, which is similar in many respects to the form shown in figures one to five inclusive and includes practically all of the advantages of such form. It is noted that this mount is shown applied to an idler construction which is somewhat different from that shown in Figure 1. The idler of Figure 13 may be termed the "live shaft" type while that of Figure 1 is of the "dead shaft" type. The "live shaft" construction of Figure 13 is clearly illustrated in Figure 15, from which it will be noted that the main roll 36 and its shaft 37 rotate together and that the shaft is supported in a bearing unit 38 which is in turn supported by brackets forming a part of the idler frame. It will be understood that the main rolls of the idler have duplicate ends of the type shown in Figure 15 and that the bearing units are supported either by an end bracket 39 and an intermediate bracket 40, or by a pair of the intermediate brackets.

The guide roll mount as shown in Figure 13 to 18 inclusive is of the clamp-on type and comprises a pair of mating clamp members 41 and 42 which are formed at adjacent ends to provide a socket for reception of one end of the spindle of guide roll 43. Bolts 44 pass through aligned apertures in the members 41 and 42 and serve to draw the members together to securely clamp the guide roll spindle between them. Approximately midway of their length the members 41 and 42 are laterally offset in relatively opposite directions to form spaced legs. These spaced leg portions are designed to straddle an end bracket 39, and for this purpose they may take the form of substantially triangular plates. Bolts 45 and 46 pass through aligned apertures in the spaced leg portions and serve to draw the same together to clamp bracket 39 between them. The bolts 45 and 46 also serve to position the mount by reason of their engagement with the outer vertical surface of the bracket. A third bolt 47 passes thru the spaced leg portions and engages a notch or semicircular recess 48 formed in the vertical strengthening rib 49 of bracket 39. Thus, bolt 47 serves to augment the clamping action on the bracket and also to definitely position the mount on the bracket.

It is to be understood that the preferred forms of the invention are those wherein the mount is an independent unit designed for clamp-on attachment to standard idlers.

Reviewing briefly, it is observed that the improved mount in its preferred forms is applicable to a wide variety of existing idler types, due to the simple clamp-on method of attachment. It is also noted that this mount utilizes a portion of the idler structure proper for its support and does not require the addition and attachment of separate supporting beams or brackets. Also, it is apparent that this improved mount does not in any way alter the construction or assembly of the rolls or other portions of the idler. Another feature of this invention is the arrangement of the guide roll mounts practically within the minimum lateral limits of the conveyor proper, thus assuring adequate clearance for tripper mechanisms of various designs, when the latter are employed. Finally, it is noted that due to the mounting of the guide roll directly on the idler and, moreover, with its axis positioned in the vertical plane which passes through the axes of the main rolls, it is practically impossible for the conveyor belt to buckle or become distorted, as often occurs where the guide roll is positioned to one side of the main rolls.

I claim:

1. The combination with a belt conveyor idler of the type which includes a frame having a transverse beam and upstanding end brackets, of a guide roll mount including means for clamping the same to said beam and one of said brackets.

2. The combination with a belt conveyor idler of the type which includes a frame having a transverse beam and upstanding end brackets, of a guide roll mount including means engaging said beam and a bracket for positioning the mount thereon, and means for clamping the mount in position.

3. The combination with belt conveyor idler of the type which includes a frame and a plurality of main rolls journaled on said frame, of a guide roll mount comprising separable sections adapted to be positioned one on either side of said frame, means for clamping said sections to said frame, and a guide roll carried by said mount.

4. The combination with a belt conveyor idler of the type which includes a frame having a transverse beam and upstanding end brackets, of a guide roll mount comprising separable sections adapted to be positioned one on either side of said frame, at least one of said sections having inwardly extending lugs positioned to engage the upper surface of said beam and the inner surface of said bracket, respectively, means for clamping said sections together, and means for supporting a guide roll thereon.

5. The combination with a belt conveyor idler of the type which includes a frame having a transverse beam and upstanding end brackets, of a guide roll mount comprising separable sections, adjacent ends of which cooperate to form a socket for reception of one end of a guide roll spindle, said sections being spaced apart throughout the remainder of their length and adapted to straddle said beam and one of said brackets, and means for drawing the sections of said mount together.

6. A guide roll mount substantially as set forth in claim 5, characterized in that said sections are provided with inwardly extending lugs adapted to engage the upper surface of said beam and the inner surface of said bracket, respectively, while said means for drawing the sections together are arranged to engage the lower surface of said beam and the outer surface of said bracket respectively.

7. The combination with a belt conveyor idler of the type which includes a frame having a transverse beam with upstanding brackets thereon, a shaft mounted in said brackets, and a main roll on said shaft, said shaft extending beyond one of said brackets, of a guide roll mount adapted to be positioned on said shaft extension and having a portion engaging said bracket to prevent oscillation of said mount on said shaft, and a guide roll carried by said mount.

8. The combination with a belt conveyor idler comprising a shaft bracket, a shaft supported by said bracket and having a portion extending outwardly beyond the same, and a main roll on said shaft, of a guide roll mount comprising separable sections adapted to engage said shaft extension, said bracket, and one end of a guide roll spindle, and means for clamping said sections together.

9. The combination with a belt conveyor idler of the type which comprises a frame including a transverse beam, upstanding end brackets on said beam and belt supporting rolls carried by said brackets, guide roll mounts comprising separate sections adapted to engage opposite edges of said upstanding brackets, means for clamping said sections to said brackets, and a guide roll carried by each of said mounts.

10. The combination with a belt conveyor idler of the type which comprises a frame including a transverse beam, upstanding end brackets on said beam and belt supporting rolls carried by said brackets, a guide roll mount comprising separate sections having portions adapted to engage opposite edges of one of said upstanding brackets, means for drawing said sections together to clamp said upstanding bracket therebetween, and means for clamping a guide roll spindle between the upper ends of said sections.

WILLIAM W. SAYERS.